United States Patent [19]
Norman

[11] 3,792,876
[45] Feb. 19, 1974

[54] VISIBLE HITCH ASSEMBLY FOR ALL PURPOSE WAGON HAVING FREELY MOVING CASTERS AS FRONT WHEELS

[76] Inventor: Richard G. Norman, 1456 S.E. 8th Ave., Rochester, Minn. 55901

[22] Filed: Aug. 18, 1972

[21] Appl. No.: 281,619

[52] U.S. Cl. ............................. 280/415 A, 280/493
[51] Int. Cl. ............................................. B60d 1/14
[58] Field of Search ... 280/493, 494, 415 A, 491 A, 280/408, 47.34

[56] References Cited
UNITED STATES PATENTS

| | | | |
|---|---|---|---|
| 1,316,193 | 9/1919 | Schaffer | 280/103 |
| 1,723,085 | 8/1929 | Sippel | 280/408 |
| 2,038,697 | 4/1936 | Winslow | 280/47.34 |
| 2,210,008 | 8/1940 | Rodin | 280/493 X |
| 3,287,026 | 11/1966 | Craven | 280/415 A |

Primary Examiner—Leo Friaglia
Attorney, Agent, or Firm—Mark W. Gehan

[57] ABSTRACT

A hitch for a wagon having freely movable casters as front wheels; said hitch comprising an assembly for attachment to the chassis of a wagon and a handle assembly for attachment to said chassis assembly; the handle assembly being attached to the chassis assembly so as to be freely movable upwardly and downwardly, and from side to side, the said arrangement providing means whereby pulling force can be applied obliquely or straightforwardly to the front end of the wagon, and distributed more evenly over the front end of the wagon, the casters forming the front wheels, turning freely under such pulling force to inhibit imbalance or overturning of the wagon.

1 Claim, 4 Drawing Figures

PATENTED FEB 19 1974 3,792,876 ated at the same time. Under such certain circumstances, pulling force applied to the hitch is likely to cause the wagon to overturn.
VISIBLE HITCH ASSEMBLY FOR ALL PURPOSE WAGON HAVING FREELY MOVING CASTERS AS FRONT WHEELS This invention relates to a hitch for a wagon having freely movable casters as front wheels. The hitch is particularly adapted for use with light-weight trailers or wagons which are designed to be pulled by hand. The invention also provides, however, a hitch which may be attached to a small tractor to pull a wagon.

The hitch of my invention is plainly visible when attached to the wagon, and thus reduces possible difficulties in repairing the hitch, etc.

Prior type hitches, of which I am aware, are intended for use with a wagon having a full front axle. Such axle swivels on a central pivot, to permit the wheels to be turned. This results in a considerable amount of imbalance of the front part of the trailer, when the hitch is turned and the axle and front wheels are likewise turned at the same time. Under such certain circumstances, pulling force applied to the hitch is likely to cause the wagon to overturn.

It is part of my invention to provide, in combination with a wagon having casters as front wheels, a hitch which is freely pivotal both upwardly and downwardly, and from side to side, whereby pulling force may be applied either straight forwardly, or obliquely. My hitch may turn (and pulling force may then be applied to it) without causing the front axle of the wagon also to turn; therefore avoiding a consequent loss of stability in the trailer or wagon.

A principal purpose of my hitch is to get the pulling force distributed over a larger portion of the front end of the wagon.

One application which I have found for my hitch is the movement of wagons used to transport athletic equipment on an athletic playing field. However, the hitch may obviously be used for other purposes. The hitch finds use in hand-pulling operations, as well as in pulling of a wagon by a tractor.

Prior art with which I am familiar is the following:

U.S. Pat. No. 1,313,470, B. J. Discher "Toy Vehicle";
U.S. Pat. No. 1,390,567, P. Krieger, Sr. "Vehicle";
U.S. Pat. No. 2,036,149, A. C. Korte "Coaster Wagon";
U.S. Pat. No. 2,038,697, E. N. Winslow "Manually Operated Tool"; and
U.S. Des. Pat. No. 176,007, Kenneth C. Dawson "Engine Supporting Stand".

Referring now to the drawings.

Figure 1:
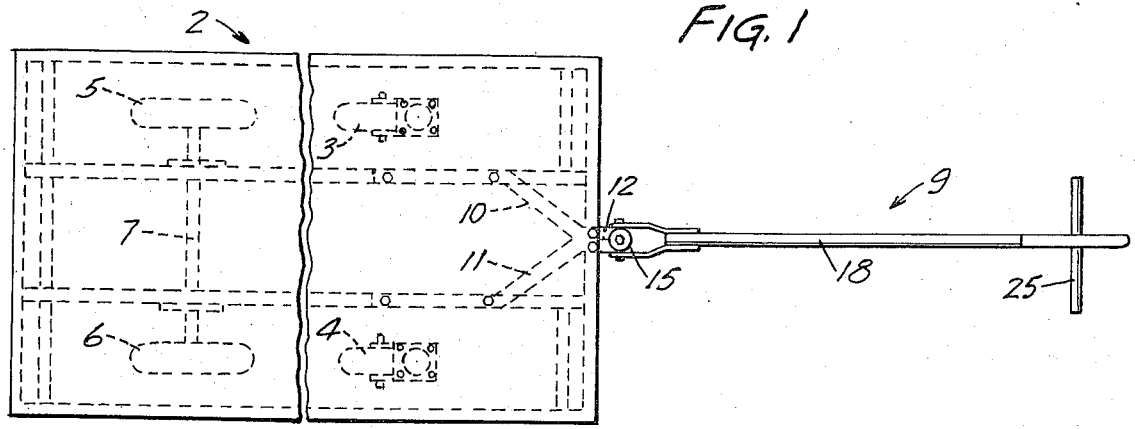
FIG. 1 is a top plan view of my hitch assembly mounted upon a wagon having freely movable casters as front wheels.
Figure 2:
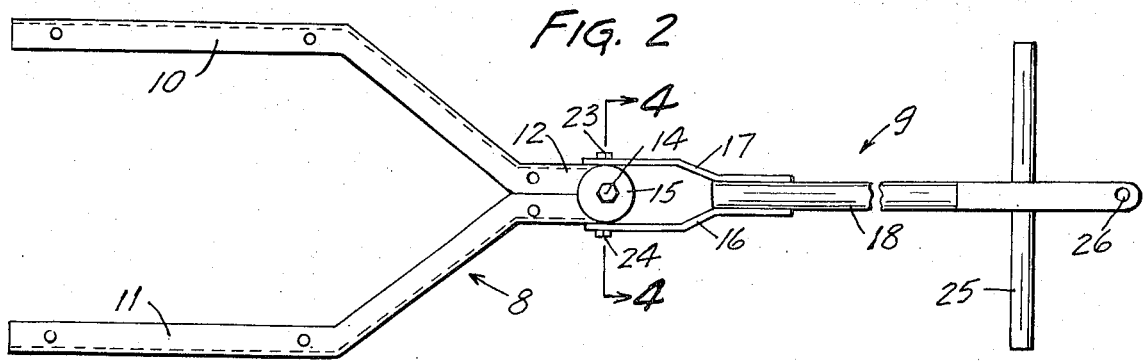
FIG. 2 is an enlarged top plan view of the hitch assembly, without the wagon.
Figure 3:
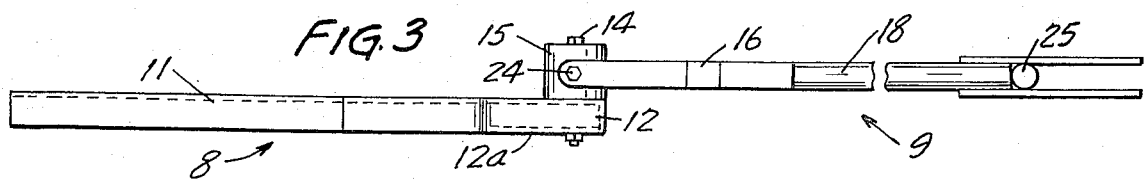
FIG. 3 is a side elevational view of the hitch assembly shown in FIG. 2.
Figure 4:
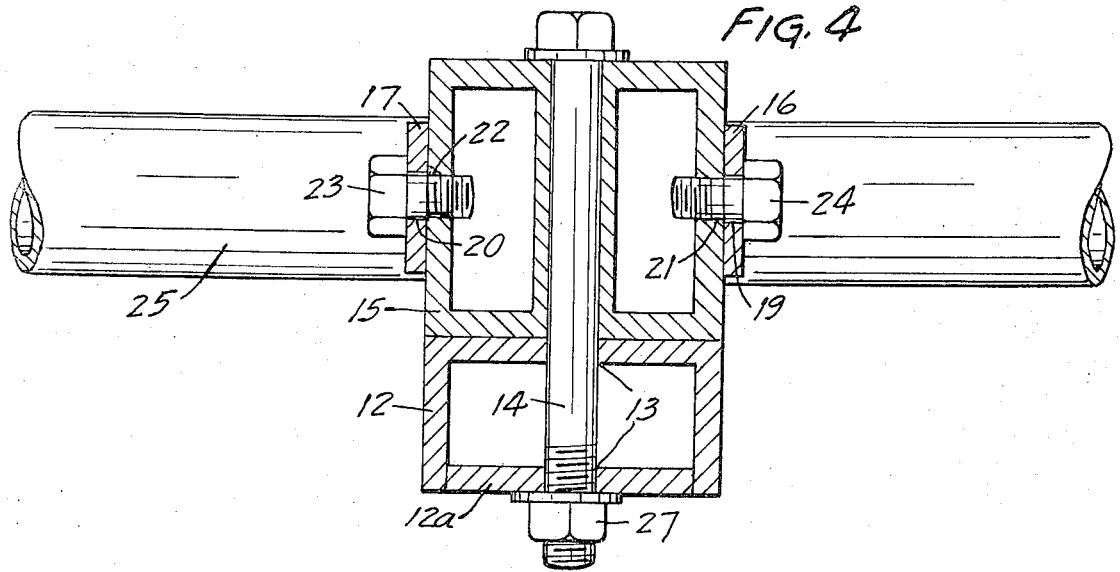
FIG. 4 is a cross sectional view taken along lines 4—4 of FIG. 2.

Referring now to the drawings in greater detail, reference character 2 designates, in a general way, a wagon. This wagon is fitted with freely movable casters 3 and 4, as its front wheels. These casters may be mounted in any conventional way upon the wagon. In the embodiment shown, wagon 2 is provided with conventional wheels 5 and 6, which, in this instance, are mounted upon a full rear axle 7.

My hitch assembly is made up, essentially, of two parts; first, a chassis assembly 8 and a handle assembly 9.

Chassis assembly 8 comprises two bars of metal 10 and 11 (angle iron in the embodiment shown), which are affixed to the underside of the wagon in parallel relationship. These bars extend lengthwise of the wagon, and the forwardly extending ends of these bars 10 and 11 converge to meet, V-like, at the front of the wagon. Bars 10 and 11, after they meet to form the V, project a short distance further in abutting parallel relationship and are one continuous unit 12, welded closed with bottom plate 12a. The front portion of unit 12 is closed in a rounded manner similar to the form of pivot member 15. Unit 12 is provided with a vertical aperture 13, extending through it. Pivot member (or pin) 14, is mounted in said aperture and extends some inches upwardly from the upper surface of closed extension of bars 10 and 11 forming the closed unit 12. Said pivot member is maintained in said aperture by means of a nut 27 applied to its threaded lower end.

Handle assembly 9 is made up of pivoting member (or cylinder) 15 with top and bottom plates; handle arms 16 and 17; and handle 18. Handle arms 16 and 17 diverge so as to span pivoting member 15. The tips of each of these arms are formed with apertures 19 and 20 which will overlie corresponding apertures 21 and 22 in pivoting member 15. Thus handle arms 16 and 17 may be attached pivotally to pivoting member 15 by means of shoulder fastening members 23 and 24. Handle 18 is provided with a crossbar 25 for convenience in pulling the wagon. Handle 18 also extends somewhat beyond crossbar 25. At its tip, handle 18 is formed with two straps welded thereto and an aperture 26 therein, through which a connection to a tractor may be obtained.

It is to be understood that the various proportions and sizes of the invention may be modified without departing from the spirit thereof; and I do not intend to be limited except as I may be limited by the following claims and structures being the equivalent of the structures set forth therein.

Having thus described my invention, what I claim is:

1. In combination, a wagon having a chassis and freely movable casters as its front wheels, and a hitch whereby said wagon may be drawn; said hitch comprising a chassis assembly and a handle assembly; said chassis assembly including a pair of bars affixed to and extending along the underside of said chassis, said bars extending beyond the front end of said chassis, and converging as they extend forwardly from said chassis; and a vertical pin attached to said bars adjacent to the forwardly projecting converged ends thereof; said handle assembly comprising a cylinder adapted to be rotatably mounted upon said pin; and a forked handle mounted for upward and downward movement upon the exterior surface of said cylinder; said structure providing a unitary, two-way swiveling connection between said chassis assembly and said handle assembly, whereby said handle assembly may be moved, in relation to said chassis assembly, in an upward and downward direction, and also in a sidewise direction.

* * * * *